United States Patent [19]

Konkle

[11] 4,305,313
[45] Dec. 15, 1981

[54] DIFFERENTIAL CASE FASTENER

[75] Inventor: Phillip E. Konkle, Albion, Mich.

[73] Assignee: Eaton Corporation, Cleveland, Ohio

[21] Appl. No.: 101,046

[22] Filed: Dec. 6, 1979

[51] Int. Cl.³ .................... F16H 1/44; F16H 1/38; F16H 1/40; F16H 57/02
[52] U.S. Cl. .................... 74/711; 74/606 R; 74/710; 74/713
[58] Field of Search .............. 74/710, 710.5, 711, 74/713, 606 R

[56] References Cited

U.S. PATENT DOCUMENTS

| | | | |
|---|---|---|---|
| Re. 28,004 | 5/1974 | Ottemann | 74/711 |
| 1,010,628 | 12/1911 | Heaslet | 74/606 X |
| 1,011,788 | 12/1911 | Hodgkinson | 74/606 R |
| 2,841,037 | 7/1958 | Kandall | 74/711 |
| 2,985,035 | 5/1961 | Toth | 74/711 |
| 3,052,137 | 9/1962 | Russell | 74/710.5 |
| 3,198,028 | 8/1965 | Dahl et al. | 74/606 X |
| 3,208,306 | 9/1965 | Lewis | 74/711 |
| 3,296,890 | 1/1967 | Anderson | 74/606 X |
| 3,365,983 | 1/1968 | Jeakle | 74/711 |
| 3,715,936 | 2/1973 | Jones | 74/710.5 X |
| 3,742,784 | 7/1973 | Engle | 74/710.5 |
| 3,815,443 | 6/1974 | McAninch et al. | 74/711 |
| 3,837,236 | 9/1974 | Kagata | 74/711 |
| 3,886,813 | 6/1975 | Baremor | 74/710.5 |
| 3,896,684 | 7/1975 | Duer | 74/711 |
| 3,915,267 | 10/1975 | Shea | 74/710.5 X |

FOREIGN PATENT DOCUMENTS 1224034 3/1971 United Kingdom .............. 74/710.5

OTHER PUBLICATIONS

"The Auto Co.", Aug. 25, 1961, Controlled-Slip Article.

Primary Examiner—Leslie Braun
Attorney, Agent, or Firm—R. J. McCloskey; M. L. Union; J. Yakimow

[57] ABSTRACT

A differential assembly 10 includes a first casing member 50 and a second casing member 52 disposed contiguous to the first casing member. The first and second casings 50, 52 are rotatable about an axis of rotation 87. The first and second casing members define a chamber 20 in which is located a pair of side gears 32, 34 each of which is connectable to an output shaft 26, 28, a pinion shaft 40, and a pair of pinion gears 36, 38 supported on the pinion shaft 40. The first casing member 50 includes a first opening 86 which is substantially radially disposed relative to the axis of rotation and the second casing member 52 includes a second opening 80 which is substantially radially disposed relative to the axis of rotation. The first and second openings 86, 80 are aligned in a radial direction and a radially extending fastener means 40 extends through the aligned first and second openings 86, 80 to secure the first casing member 50 to the second casing member 52 to prevent relative movement of the first and second casing members in a direction substantially parallel to the axis of rotation and to prevent rotation of casing 50 with respect to casing 52.

10 Claims, 3 Drawing Figures

DIFFERENTIAL CASE FASTENER

BACKGROUND OF THE INVENTION

1. Field of the Invention

The present invention relates to a differential assembly for vehicle and more particularly to a differential assembly including a two-piece casing which forms the housing for the differential assembly and wherein the casing is held together by fastener means which extends radially from the axis of rotation of the differential housing.

2. Background of the Invention

There are many known differential mechanisms in the prior art which are used to compensate for slipping of one of the drive wheels of a pair of drive wheels of a vehicle. In the prior art differential mechanisms, the casings are generally formed from two pieces. The two casing pieces generally include a reinforced portion or flange thereon which allows a plurality of bolts to extend between the casing pieces to secure the casing pieces together. The normal configuration is for the bolts to be disposed parallel to the axis of rotation of the casing member.

In such a configuration, it is necessary to provide a reinforced housing portion through which the axially extending bolts extend. Such a reinforced housing portion adds to the weight of the differential and increases its size due to the fact that the casing must be reinforced to support the bolts or fastener members. Such examples of the prior art construction are disclosed in the Shea U.S. Pat. No. 3,915,267, the Engle U.S. Pat. No. 3,742,784 and the Ottemann U.S. Pat. No. Re. 28,004.

The present invention attempts to overcome the problems associated with the prior art by utilizing a radially extending fastener which in the preferred embodiment is the pinion shaft which is utilized to fasten the two casing portions together. The utilization of such a construction decreases the size and weight of the differential by eliminating flange portions or reinforced portions in the housing through which the fasteners are normally secured.

SUMMARY OF THE INVENTION

The present invention provides a new and improved differential assembly including a first casing member and a second casing member disposed contiguous to the first casing member. The first and second casing members are rotatable about an axis of rotation and define a chamber located therebetween. The chamber includes a pair of side gears disposed therein, a pinion shaft, and a pair of pinion gears supported on the pinion shaft and each of which meshes with the pair of side gears. The first casing member includes a first opening means including a first opening which is disposed substantially radially relative to the axis of rotation and the second casing member includes a second opening means including a second opening which is disposed substantially radially relative to the axis of rotation. The second opening means is disposed in a juxtaposed relation to the first opening means with the first radial opening being aligned in a radial direction with the second radial opening. A radially extending fastener means extends through the aligned first and second openings and the first and second casing members to secure the first casing member to the second casing member.

Another object of the present invention is to provide a new and improved differential assembly as set forth in the preceeding paragraph wherein the radially extending fastening means comprises the pinion shaft. The pinion shaft extends through the first and second openings to secure the first casing member to the second casing member and prevent relative movement of the first and second casing members in a direction substantially parallel to the axis of rotation.

DESCRIPTION OF THE PREFERRED EMBODIMENT

Figure 1:
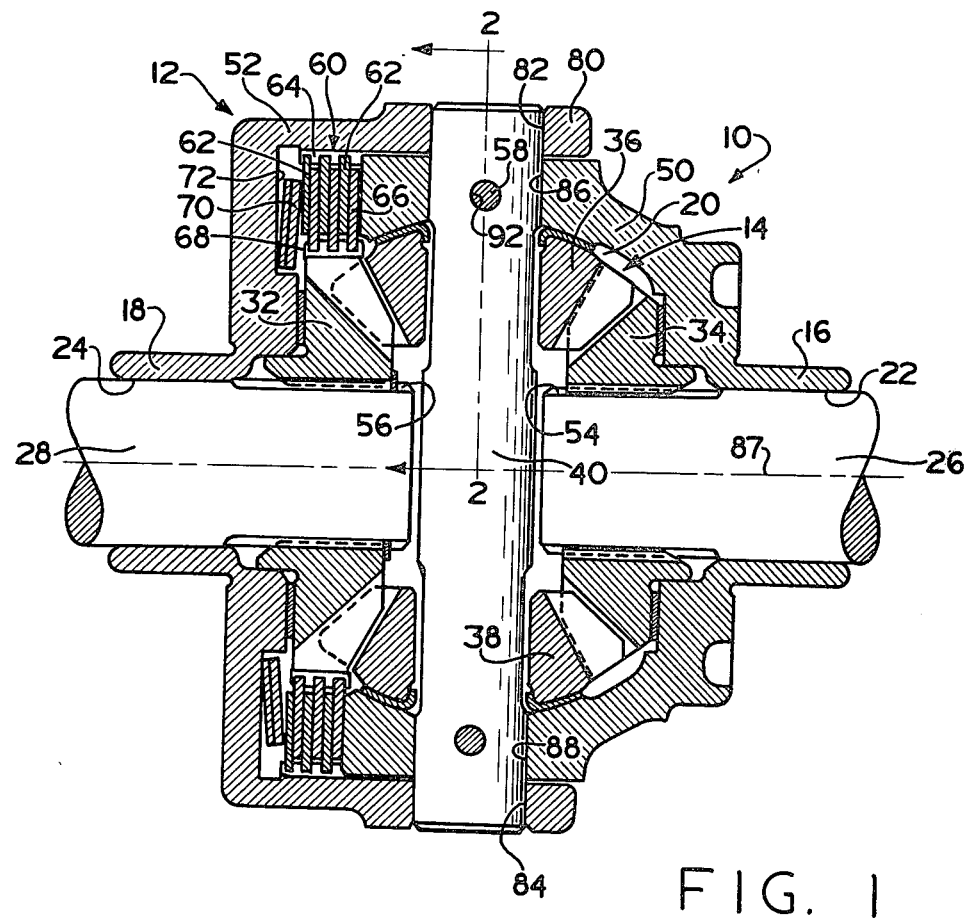
FIG. 1 is a cross sectional front schematic view illustrating the present invention.
Figure 2:
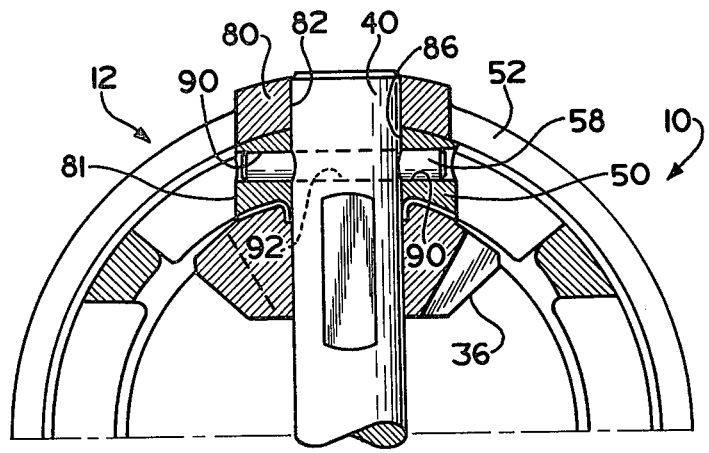
FIG. 2 is a partial section view taken approximately along the line 2—2 of FIG. 1 illustrating a partial side view of the present invention.

The differential drive assembly 10, more fully illustrated in FIGS. 1 and 2, is especially suitable for use in driving ground or surface engaging traction wheels of a vehicle. The differential drive assembly includes a rotatable planet gear carrier or casing 12 formed from housing portions 50 and 52 and a differential gear train 14 disposed within the casing 12. The planet gear carrier 12 defines a gear chamber 20 disposed between housing portions 50, 52 in which the gear train 14 is located. The housing portions 50 and 52 each include a support portion 16, 18, respectively, adapted to be received in bearings of a supporting structure, such as an axle housing, not shown, by which the carrier 12 is supported to rotate about an axis of rotation 87. The support portions 16, 18 are provided with axial openings 22, 24, respectively, which communicate with chamber 20 and are adapted to receive or accommodate driven or power output means as represented by axle shafts 26, 28 respectively, whose outer end portions are connected with traction wheels, or the like, not shown, and whose inner or adjacent end portions are connected with the gear train 14 by suitable splines 54, 56, which are formed on the inner ends of shafts 26, 28, respectively.

The differential drive assembly 10 includes an input means (not illustrated), such as a ring gear or other gear means, which is affixed to one of the casing portions 50, 52 to drive the casing 12 in a well known manner. A suitable drive gear, not shown, meshes with the input means and represents the power input means for the differential drive assembly 10. Upon rotation of the drive gear and rotation of the input means, the planet carrier 12 rotates.

The gear train 14 is operable to transmit the rotary motion of the planet carrier 12 to the output shafts 26, 28. The gear train 14 includes a pair of beveled side gears 32, 34 and a group of beveled pinion planetary gears 36, 38, disposed between and meshed in engagement with the side gears 32, 34 for drivingly connecting the latter. The planetary gears 36, 38 are rotatably supported in the carrier 12 by means of a pinion shaft 40 extending across the gear chamber 20 and secured to the carrier 12 by an anchor pin 58, more fully described hereinbelow.

The side gears 32, 34 and pinion gears 36, 38 are, in the preferred embodiment, all beveled gears of conventional form as far as the teeth thereof are concerned, and the tooth profiles are of a conventional shape having pressure angle values coming within the usual range of such valves. The side gears 32, 34 are provided with splines which mesh with the splines 54, 56 on the output shafts 26, 28, to drivingly connect the side gears 32, 34 to the shaft 28, 26, respectively. The structure and operation of the differential gear mechanism utilizing a differential gear train such as the gear train 14, is more fully disclosed in U.S. Pat. No. 3,392,601, which is incorporated herein by reference.

The differential mechanism 10 of the present invention is preferably what is known as a limited slip. To this end the preferred embodiment has been illustrated as a limited slip differential including a clutch pack 60 which is disposed within the chamber 20. The clutch pack 60 includes a plurality of annular clutch plates 62 which are splined to splines 64 formed on an inner surface of the housing portion 52. The clutch plates 62 rotate with the housing portion 52 and are movable axially relative thereto along the splines 64. A plurality of annular clutch plates 66 are interleaved between the clutch plates 62 and are supported on splines 68 formed on an outer surface of the beveled gear 32. The clutch plates 66 rotate with the beveled gear 32 and are movable axially along the splines 68. A bevel washer 70 is disposed between a shoulder 72 disposed on the housing portion 52 and the clutch pack 60 to bias the clutch plates 62 and 66 into engagement with each other.

During normal non slipping operations, the casing 12 and output shafts 26, 28 rotate as a unit and there is no relative rotation of the clutch plates 62 and 66. During normal operation the torque input into the casing 12 equals the torque output on the output shafts 26 and 28 and the velocity of the input is equal to the average velocity of the output shafts 26, 28. When one of the wheels starts to slip, such as when the wheel hits a patch of ice, one of the output shafts 26, 28 speeds up relative to the other. This causes relative rotation of the casing 12 and the beveled gear 32 in a well known manner. The relative rotation of the casing 12 and the gear 32 effects relative rotation of the clutch plates 62, 66 which tends to add a resistance torque to the slipping wheel. The addition of the resistance torque limits the slip of the slipping wheel and controls the torque output to the non-slipping wheel to prevent slipping thereof. The operation of a limited slip differential is more fully disclosed in the Russell U.S. Pat. No. 3,052,137, assigned to the Assignee of the present invention, which is incorporated herein by reference. Additionally, while the present invention has been shown utilizing a limited slip differential, it should be apparent that any differential or traction modifier differential could also be utilized in the present invention such as disclosed in U.S. Pat. No. Re. 28,004 to W. C. Ottemann and such patent is incorporated herein by reference.

The casing 52, as illustrated in FIG. 1, includes an axial extending flange portion 80 which is disposed in a juxtaposed relation to an axially extending portion 81 of the casing portion 50. The flange portion 80 includes openings 82 and 84 therein and may be a continuous or discontinuous flange which includes portions for defining the diametric openings 82, 84. The openings 82 and 84 are radially disposed and radially aligned relative to the axis of rotation 87 of the unit 12. The housing portion 50 includes the axial ending portion 81 thereof which includes openings 86, 88 therein. The openings 86, 88 are also radially disposed relative to the axis of rotation 87 and are aligned in a radial direction with the openings 82, 84 in the housing portion 52.

In the preferred embodiment, the pinion shaft 40 is disposed within the housing 12 and extends through the openings 82, 84, 86 and 88 disposed in the housing portions 52 and 50. The location of the pinion shaft 40 in its position illustrated in FIG. 1 secures the housing portion 52 to the housing portion 50 and prevents relative movement between the housing portions 50, 52 in a direction parallel to the axis of rotation 87, and also prevent any relative rotation between the cases 50 and 52. The anchor pin 58 is disposed within a passageway 92 located in the pinion shaft 40 and in passageways 90 disposed in the axial extending portion 81 of the housing portion 50. The anchor pin 58 cooperates with the passageways 90 and 92 to prevent radial as well as axial movement of the pinion shaft 40 as illustrated in the FIGURES to prevent movement of the pinion shaft 40 from the openings 82, 84, 86 and 88. Thus, it should be apparent that the housing portions 50, 52 are interconnected by the pinion shaft 40 which serves both as a fastener for fastening the housing portions 50, 52 to prevent relative movement therebetween in a direction parallel to the axis of rotation 86 and to prevent any relative rotation between housing portions 50 and 52 and serves as a support for the pinion gears 36, 38. The utilization of the pinion shaft 40 as a radially disposed fastener eliminates the need for a reinforced radially extending flange around the exterior of the housing portions 50, 52 which is normally utilized to bolt the housing portions 50, 52 together. This reduces the size of the unit and the weight thereof.

Figure 3:
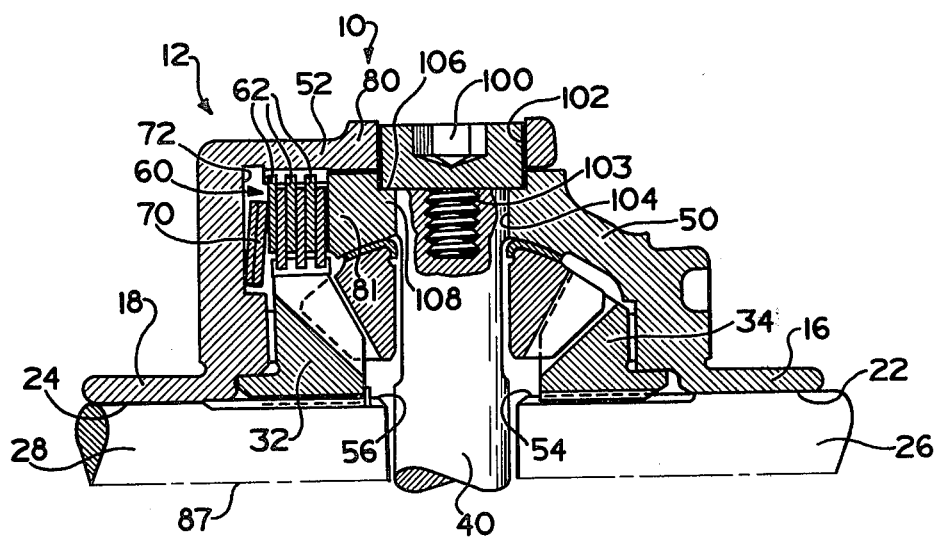
FIG. 3 is a fragmentary front cross sectional view of an alternate embodiment of the present invention.

A further embodiment of the present invention is illustrated in FIG. 3 wherein a pair of radially extending fasteners, only one of which is illustrated, as the bolts 100, are utilized to interconnect the housing portions 50, 52. In the embodiment of the invention illustrated in FIG. 3, like parts from the FIGS. 1 and 2 embodiment are indicated with like numerals. In this embodiment, the flange 80 of the housing portion 52 includes a pair of radially extending openings 102, only one of which is illustrated, therein. The housing portion 50 also includes a pair of radially extending openings 104, only one of which is illustrated, in the axial extending portion 81 thereof, which are aligned in a radial direction with the openings 102 in the flange portion 80. The openings 102, 104 are each adapted to receive a bolt 100 which extends in a radial direction through the openings 102, 104 and which interconnects the housing portions 50, 52. The bolt 100 is preferably threaded in an axial fashion into the threaded recess 103 located in the pinion shaft 40. A suitable pin, not illustrated, such as the anchor pin 58, can be used to interconnect the pinion shaft 40 with the casing portions 50, 52 to prevent movement of the pinion shaft in a radial direction relative to the casing portions 50, 52. Alternatively, the head of the bolt 100 can include a shoulder portion 106 thereon which cooperates with a shoulder 108 on the casing member 50 to prevent axial movement of the pinion shaft 40 relative to the casing 12. While only the upper portion of the differential has been illustrated in FIG. 3, it should be apparent that the pair of bolts 100 are radially aligned in the openings 102, 104 on the housing portions 50, 52 with the bolt 100 (not illustrated) located in the lower portion of the housing as viewed in FIG. 3 being disposed in a similar fashion to the illustrated bolt 100 disposed in the upper portion of the housing. The upper bolt 100 cooperates with the shoulder 108 to prevent downward movement of the pinion shaft 40 relative to the housing as viewed in FIG. 3 and the lower bolt 100, not illustrated, cooperates with a similar shoulder, not illustrated, to prevent upward vertical movement of the pinion shaft 40 relative to the housing. The pair of bolts 100 thus cooperates to prevent movement of the pinion shaft 40 in a radial direction and also secure the housing portions 50, 52 together to prevent movement therebetween in an axial direction. The use of the radially extending fasteners 100 also eliminates the need for the reinforced flange which is normally utilized to bolt the housing portions together of a differential assembly. The radially extending fasteners 100 thus allow a reduction in size of the unit 12 and a reduction in the weight thereof. It should be apparent that any number of bolts similar to 100 can be used to secure the housing portions. The bolts need not bolt into the pinion shaft. The bolts could also screw into the case 50 or any other suitable member.

From the foregoing it should be apparent that a new and improved differential assembly has been provided. The new and improved differential assembly includes a first casing member and a second casing member adapted to be disposed contiguous to the first casing member. The first and second casing members rotate about an axis of rotation and define a chamber located therebetween. A pair of side gears, each of which is connectable to an output shaft, a pinion shaft, and a pair of pinion gears supported on the pinion shaft and each of which meshes with the pair of side gears are located in the chamber defined between first and second casing. The first casing includes a first opening therein which is disposed substantially radially relative to the axis of rotation and the second member includes a second opening thereon which is disposed substantially radially relative to the axis of rotation. The first and second openings are radially aligned and a radially extending fastening means extends through the aligned openings to secure the first casing member to the second casing member and prevent relative movement therebetween in a direction parallel to the axis of rotation and/or relative rotation between the cases. In one embodiment of the invention the fastener means comprises the pinion shaft and in a second embodiment of the invention a plurality of radially extending bolts are utilized to secure the casing members together.

I claim:

1. A differential assembly comprising a first casing member, a second casing member adapted to be disposed contiguous to said first casing member, said first and second casing members being rotatable about an axis of rotation, said first and second casing members defining a chamber located therebetween, a pair of side gears disposed in said chamber and each of which is connectable to an output shaft, a pinion shaft located in said chamber, a pair of pinion gears supported on said pinion shaft and each of which meshes with said pair of side gears, said first casing member having first opening means thereon including a first opening which is substantially radially disposed relative to said axis of rotation, said second casing member having second opening means thereon including a second opening which is substantially radially disposed relative to said axis of rotation, said second opening means being disposed in a juxtaposed relation to said first opening means with said first radial opening in said first opening means being aligned in a radial direction with said second radial opening in said second opening means, and radially extending fastening means extending through said aligned first and second openings in said first and second casing members to secure said first casing member to said second casing member, and wherein said radially extending fastening means comprises said pinion shaft, said pinion shaft extending through said first and second openings disposed in said first and second casing members to secure said first casing member to said second casing member and prevent relative movement of said first and second casing members in a direction substantially parallel to said axis of rotation.

2. A differential assembly as defined in claim 1 wherein said first casing member includes a first flange thereon extending substantially parallel to said axis of rotation, said second casing member includes a second flange thereon extending toward said first flange in a direction substantially parallel to said axis of rotation, said first and second flanges being disposable in a juxtaposed relationship, said first flange having said first opening means thereon and said second flange having said second opening means thereon.

3. A differential assembly comprising a first casing member, a second casing member adapted to be disposed contiguous to said first casing member, said first and second casing members being rotatable about an axis of rotation, said first and second casing members defining a chamber located therebetween, a pair of side gears disposed in said chamber and each of which is connectable to an output shaft, a pinion shaft located in said chamber, a pair of pinion gears supported on said pinion shaft and each of which meshes with said pair of side gears, said first casing member having first opening means thereon including a first opening which is substantially radially disposed relative to said axis of rotation, said second casing member having second opening means thereon including a second opening which is substantially radially disposed relative to said axis of rotation, said second opening means being disposed in a juxtaposed relation to said first opening means with said first radial opening in said first opening means being aligned in a radial direction with said second radial opening in said second opening means, and radially extending fastening means extending through said aligned first and second openings in said first and second casing members to secure said first casing member to said second casing member, and wherein said fastener means comprises said pinion shaft, said first opening means further includes a third opening disposed in said first casing member diametrically opposite said first opening and extending in a substantially radial direction, said first and third openings being aligned, and said second opening means further including a fourth opening disposed in said second casing member diametrically opposite said second opening and extending in a substantially radial direction, said second and fourth openings being aligned, said pinion shaft being received in said first, second, third and fourth openings.

4. A differential assembly as defined in claim 3 wherein said first, second, third and fourth openings are aligned in a radial direction and said fastener member comprises said pinion shaft, said pinion shaft extending through said first, second, third and fourth openings to secure said first casing member to said second casing member and prevent relative movement of said first and second casing members in a direction substantially parallel to said axis of rotation.

5. A differential assembly as defined in claim 4 wherein said first opening is disposed contiguous to said second opening and said third opening is disposed contiguous to said fourth opening.

6. A differential assembly as defined in claim 4 further including second fastening means for securing said pinion shaft in said first, second, third and fourth openings to prevent relative movement of said pinion shaft and said first and second casing members in a radial direction.

7. A differential assembly as defined in claim 6 wherein said second fastening means for securing said pinion shaft in said first, second, third and fourth openings includes first and second fastening members, both of which extend in a direction substantially parallel to said axis of rotation through at least one of said first and second casing members and into said pinion shaft to prevent relative movement of said pinion shaft and said casing members in a radial direction.

8. A differential assembly comprising a first casing member, a second casing member adapted to be disposed contiguous to said first casing member, said first and second casing members being rotatable about an axis of rotation, said first and second casing members defining a chamber located therebetween, a pair of side gears disposed in said chamber and each of which is connectable to an output shaft, a pinion shaft located in said chamber, a pair of pinion gears supported on said pinion shaft, each of which meshes with said pair of side gears, said first casing member having first opening means therein including a first opening and a third opening, both of which are substantially radially disposed relative to said axis of rotation, said second casing member having second opening means therein including a second opening and a fourth opening, both of which are substantially radially disposed relative to said axis of rotation, said second opening means being disposed in a juxtaposed relation to said first opening means with said first radial opening in said first opening means being aligned in a radial direction with said second radial opening in said second opening means and said third radial opening in said first opening means being aligned in a radial direction with said fourth radial opening in said second opening means and radially extending fastening means extending through said aligned first and second and third and fourth openings in said first and second casing members to secure said first casing member to said second casing member, said radially extending fastening means including a plurality of fasteners, one of which is receivable in each of said aligned pairs of first and second and third and fourth openings, each of said plurality of fasteners extending in a substantially radial direction through said pairs of aligned openings and securely fastened within said pinion shaft to prevent relative movement of said first and second casing members in a direction substantially parallel to said axis of rotation.

9. A differential assembly comprising a first casing member, a second casing member adapted to be disposed contiguous to said first casing member, said first and second casing members being rotatable about an axis of rotation, said first and second casing members defining a chamber located therebetween, a pair of side gears disposed in said chamber and each of which is connectable to an output shaft, pinion shaft means located in said chamber, a pair of pinion gears supported on said pinion shaft means and meshing with said pair of side gears, said first casing member having first opening means thereon including a first opening which is substantially radially disposed relative to said axis of rotation, said second casing member having second opening means thereon including a second opening which is substantially radially disposed relative to said axis of rotation, said second opening means being disposed in a juxtaposed relation to said first opening means with said first radial opening in said first opening means being aligned in a radial direction with said second radial opening in said second opening means, and said pinion shaft means extending through said aligned first and second openings in said first and second casing members to secure said first casing member to said second casing member and prevent relative movement of said first and second casing members in a direction substantially parallel to said axis of rotation.

10. A differential assembly as defined in claim 9 further including fastening means for securing said pinion shaft means in said first and second openings to prevent relative movement of said pinion shaft means and said first and second casing members.

* * * * *